Nov. 21, 1950           J. W. KNAPP           2,531,337
POLYCHROME BEAM LIGHT SIGNAL
Filed Jan. 3, 1944           5 Sheets-Sheet 1
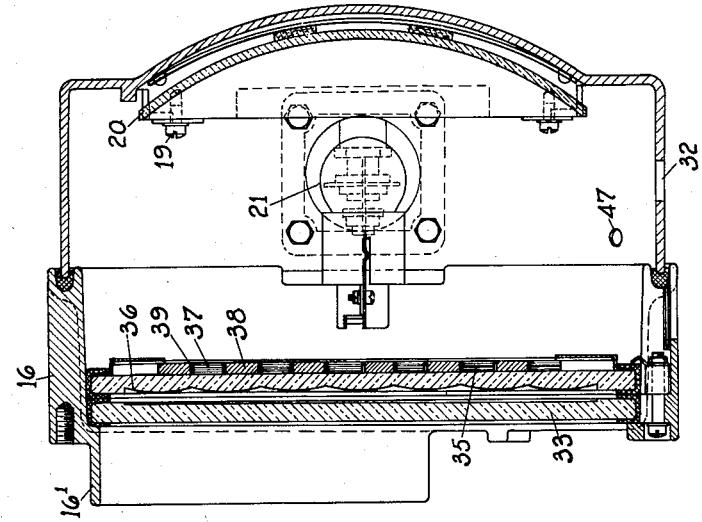
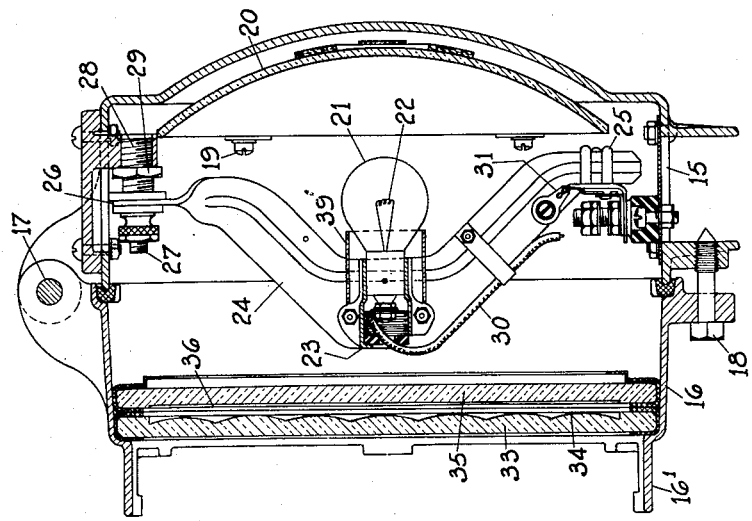
Inventor
J. W. Knapp,
By Neil W. Preston,
his Attorney

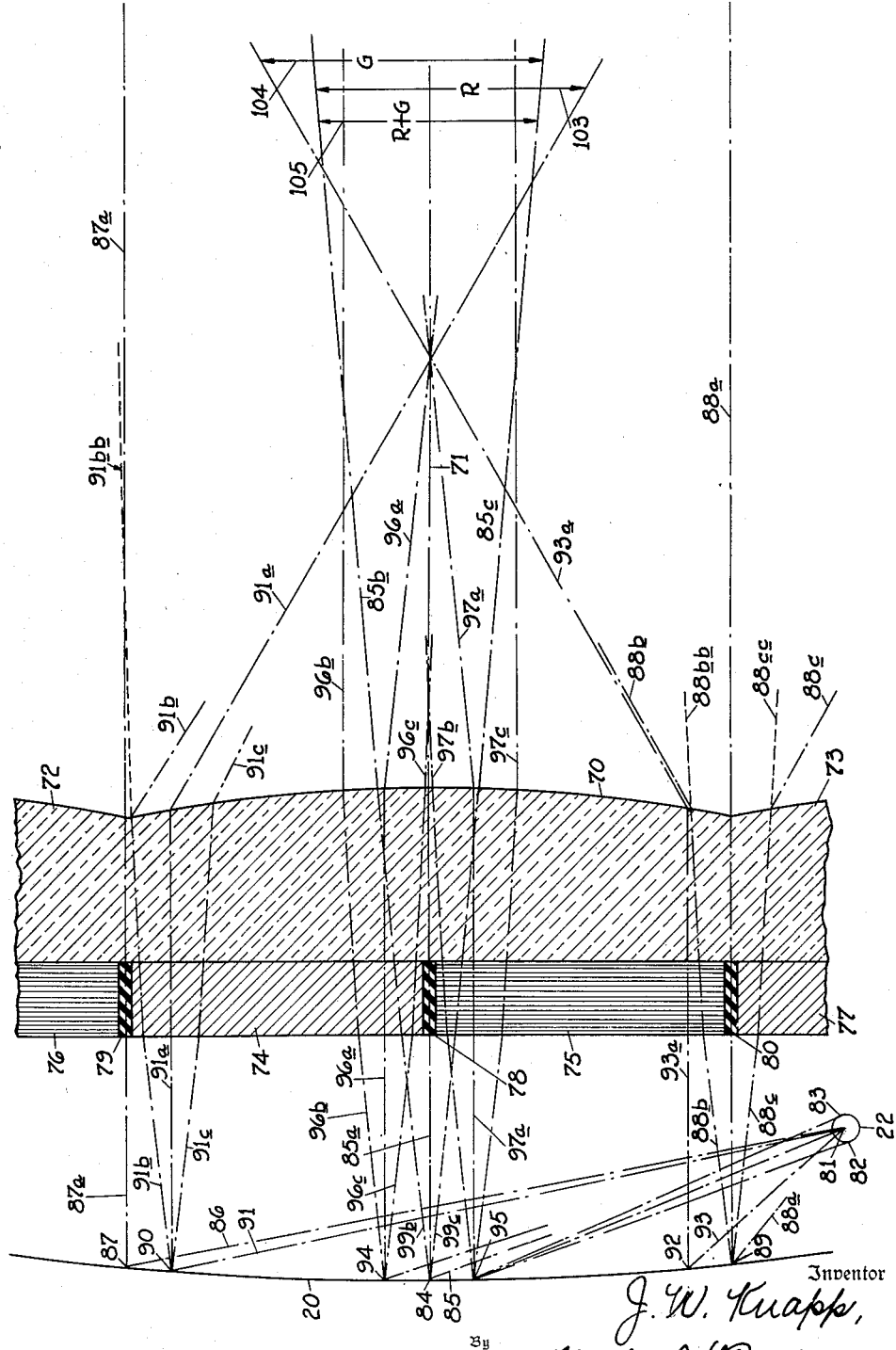

Nov. 21, 1950   J. W. KNAPP   2,531,337
POLYCHROME BEAM LIGHT SIGNAL
Filed Jan. 3, 1944   5 Sheets-Sheet 3
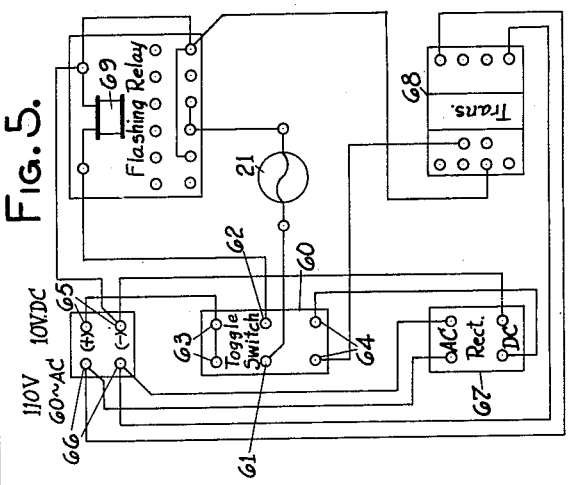
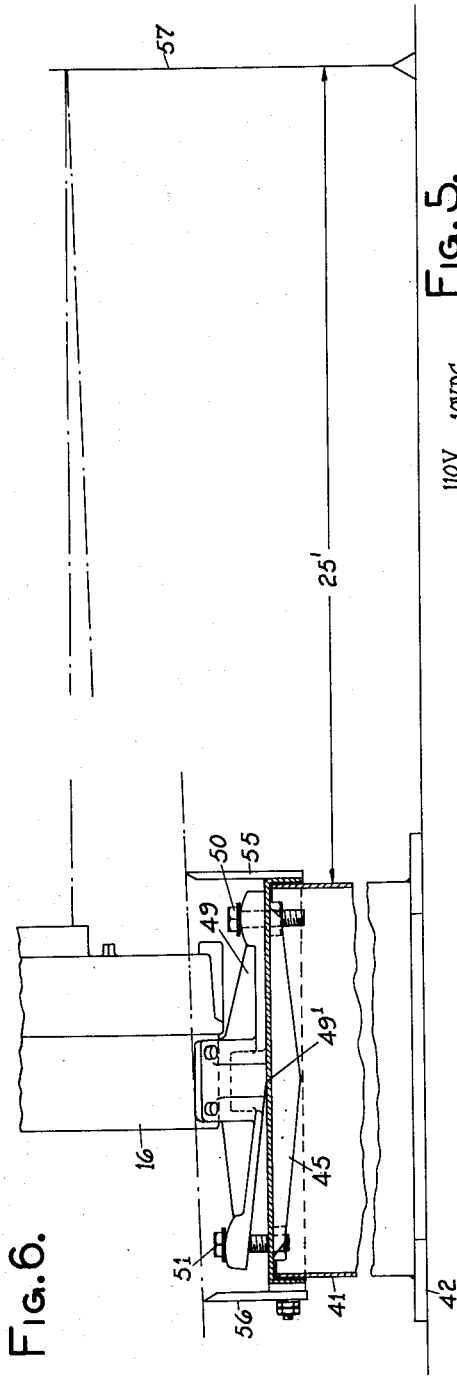
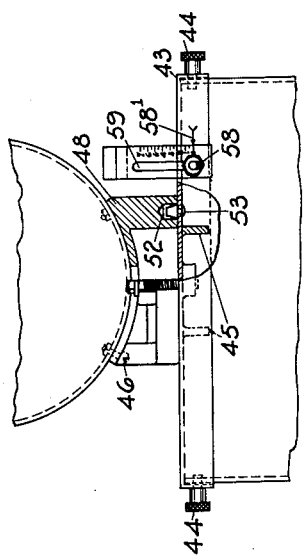
Inventor
J. W. Knapp,
Neil A. Prestow,
By   his Attorney Nov. 21, 1950 — J. W. KNAPP — 2,531,337
POLYCHROME BEAM LIGHT SIGNAL
Filed Jan. 3, 1944 — 5 Sheets-Sheet 4

Inventor
J. W. Knapp,
By Neil W. Preston,
his Attorney

Nov. 21, 1950  J. W. KNAPP  2,531,337
POLYCHROME BEAM LIGHT SIGNAL
Filed Jan. 3, 1944  5 Sheets-Sheet 5
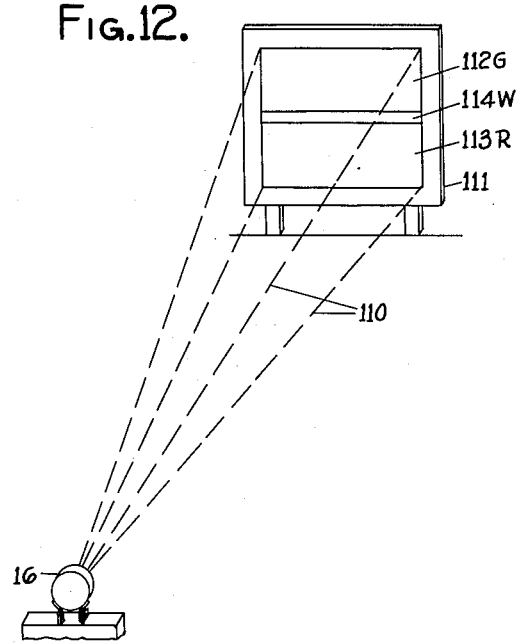
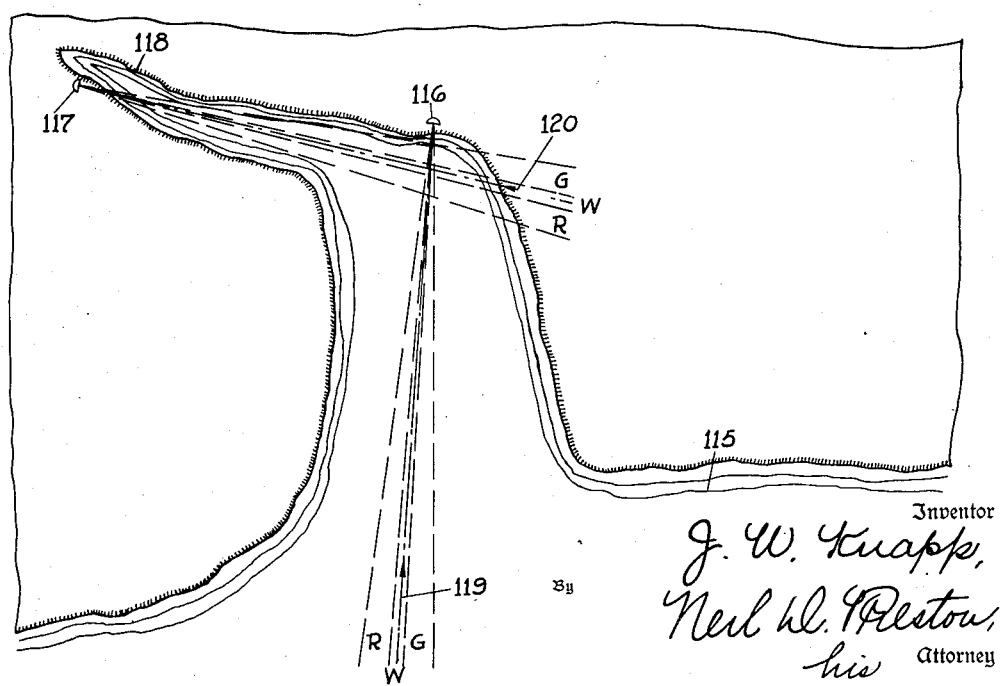

Patented Nov. 21, 1950

2,531,337

UNITED STATES PATENT OFFICE 2,531,337

POLYCHROME BEAM LIGHT SIGNAL

James W. Knapp, Brockport, N. Y., assignor to General Railway Signal Company, Rochester, N. Y.

Application January 3, 1944, Serial No. 516,815

4 Claims. (Cl. 177—352)

This invention relates, in general, to light signals of the search-light type, and has more particular reference to a signal emitting a polychrome light beam and particularly adapted for the guidance of aircraft and water surface craft.

The signal, in accordance with the present invention, is somewhat similar to that disclosed in the S. P. Saint application, Ser. No. 443,116, filed May 15, 1942 now Patent Number 2,475,256. As in such application, the signal is contemplated as being employed as a rotating, variably tilting type of signal for defining the approach to a landing field, or as a tilted, non-rotatable signal for defining a glide path for aiding a plane to land on an adjacent landing runway.

One object of the present invention is to provide a signal producing a glide light path limited on opposite sides, either in a vertical or a horizontal plane, by light beams of distinctive characters.

Another object of the present invention is to provide means for accurately controlling the angular spread of the beam constituting the glide path.

Another object of the present invention is to provide such limiting characters of light as to cause the region in which they overlap to be of a distinctive character of light.

Another object of the present invention is to provide means in the signal whereby no light from the light source employed can pass directly to the outside of the signal, and so that it must very largely first be reflected from a controlling reflector before emerging from the signal, whereby to very accurately control the character of the emitted light beam.

Another object of the present invention is to provide means for readily adjusting the tilt of the signal with respect to the horizontal, and for readily reproducing a predetermined tilt, in the field, and after repair to or replacement of parts in the signal.

Further objects, purposes and characteristic features of the present invention will appear as the description progresses, reference being made to the accompanying drawings showing, solely by way of example, and in no way in a limiting sense, several forms which the invention can assume.

In the drawings:

Fig. 1 is a fragmentary sectional elevation of a signal in accordance with this invention with with parts shown in full.

Fig. 2 is a fragmentary, sectional plan view of the signal with parts shown in full.

Fig. 3 is a wholly diagrammatic view of a portion of one optical system employed in this invention.

Fig. 4 is a fragmentary, elevational view of mounting and adjusting means for the signal unit.

Fig. 5 is a wiring diagram of control circuits and devices for the signal.

Fig. 6 is a diagrammatic side elevational view of the mounting and adjusting means for the signal unit.

Fig. 12 is a wholly diagrammatic view of any of the signals in accordance with this invention, and of the beam as projected upon a screen.

Fig. 13 is a wholly diagrammatic view of the application of any of the various forms of signals in accordance with this invention as applied to the control of water surface craft.

Figure 7:
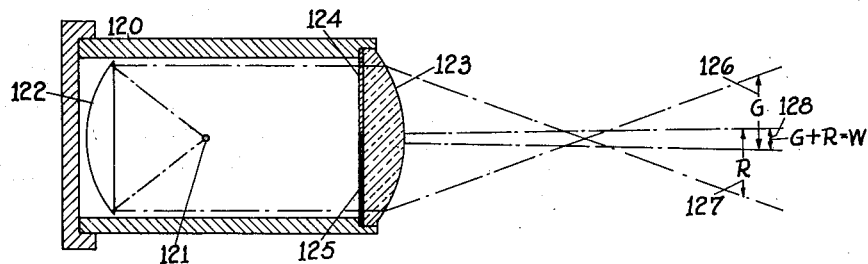
Fig. 7 is a wholly diagrammatic view of a modified form of signal in accordance with this invention.

Referring now to the drawings, and first to Figs. 1 and 2 thereof, there is shown one form of a light signal in accordance with the present invention. The signal is of the general type as disclosed in the patent to E. W. Moore, No. 2,035,397, granted March 24, 1936, and accordingly, the details of the construction and adjustments need not be pointed out with any great particularity as reference therefor can be made to this patent.

The signal comprises a casing 15 having a front cover 16 hinged thereto as at 17 and securable in place, when closed, by a threaded member 18. The casing has secured to it by suitable means, such as bolts 19, a parabolic reflector 20.

A light source in the form of an incandescent bulb 21 is employed, and this bulb has a concentrated type filament 22 which is centered at the focal point of the reflector. The lamp 21 is received in a socket 23, suitably secured to a bracket 24, one end of which is slidable in a holding member 25, while the other end 26 is carried on a cam (not shown) forming part of an adjusting screw 27 received in a threaded boss 28 of the casing and capable of being clamped in adjusted position as by a nut 29. By means of the adjusting screw 27 and its cam, the end 26 of the bracket can be moved in three different directions at right angles to each other whereby to adjust the lamp to position its filament at any desired point in space within given limits.

The filament is supplied with energy through lead-in wires 30 and 31 which are received in a suitable opening 32 in the casing.

The front of the cover 16 carries an extending member 16¹ for receiving a sun-shade or visor in the usual manner.

Cover 16 is supplied with an optical system including a front prismatic lens 33 having a plurality of vertical fluted portions or prisms as at 34, for example, whereby to produce a desired horizontal spread in the emitted beam of an angle of perhaps 15° to each side of the central axis.

To the rear of lens 33 is a lens 35 of the prismatic type and having a plurality of horizonally positioned flutes or prisms as at 36. These prisms are convexed outwardly, and where they join each other is a low or root portion, and at the center line of each is a high, or crown portion.

To the rear of lens 35 is positioned a plurality of color filters extending parallel with the prisms. There are two filters to each flute, one extending from the crown to the root above as the filter 37, and being a red filter, and the other as 38, extending from the crown downwardly to the root below and being a green filter. The filters are separated from each other by relatively narrow, opaque portions, as 39, and the various flutes with their corresponding filters and opaque portions all positioned as just described, function to produce a polychrome light beam of a type to be described more fully below. The filters can be held in place in any desired manner as by cementing them into place, and the opaque separators when narrow enough, can be constituted by the film of cement between the filter edges.

It may, however, be here stated that the emitted light beam is constituted by a green portion extending above the principal axis of the lens system and a red portion extending below the principal axis with an intermediate white or clear portion, at the axis, produced by an overlap of the red and the green portions which red and green colors are so chosen as to combine and produce clear or white light.

The light from filament 22 very largely passes directly and uninterruptedly to the reflector from which it is reflected in paths at and substantially at right angles to the lens system to pass through the lenses and be emitted from the signal in the desired beam form. To ensure that light from the source shall not pass directly and uninterruptedly to the lens system without having first been directed by the reflector, a baffle in the form of a cylindrical opaque sleeve 39' is employed. This sleeve is fastened, in any suitable manner, to bracket 24 and can be made of such opaque material as copper or the like. Sleeve 39' is so proportioned and positioned, as shown in the drawing, that light from the filament cannot pass directly or uninterruptedly to the lens system without first at least having been reflected off various opaque surfaces such as those of the sleeve, the lamp base, etc. Hence, the only light which can materially contribute to the emitted beam is light which has been directed by the parabolic reflector.

The light signal, as described above, is mounted in an adjustable manner on a supporting control box 41, which in turn is mounted on any suitable base 42 (see Figs. 4 and 6). The top of the control box 41 is closed by a cover 43, removably held in place, as by studs 44. The top 43 is reinforced by ribs 45 to furnish sufficient strength to hold the supported signal structure without danger of any bending or deformation.

The signal at its casing 16 is fastened as by bolts 46 passing through holes 47 in the casing to a saddle-like curved member 48 formed as a part of a long angular beam structure 49, carrying adjusting bolts 50 and 51 received in the top. Beam 49 is pivoted as at 49¹ to rock on top 43 by means of sockets 52 in the beam received on studs 53 carried by top 43. By means of the adjusting bolts 50 and 51, the beam, with its carried signal, can be tilted throughout any desired part of a given range and then clamped tightly in place against the cover.

Carried by cover 43 is a line of sights constituted by a fixed front sight 55, and a movable rear sight 56. The line of sight is afforded by sighting over the tops of these two sights. In the initial adjustment of the signal and during the final stages of manufacture, the signal is mounted as described just above on cover 43, and in front of it and at exactly 25 feet from the front of the signal box 41 is positioned a screen, as 57, on which the beam from the signal is projected (see Fig. 6). The top of box 41 is accurately leveled as by a spirit level. Then the light beam of the signal, projected on the screen, is adjusted in accordance with accurate measurements by means of the adjusting bolts 50 and 51, to be accurately horizontal or level. The rear sight 56 is then moved on its adjusting stud 58 by means of a slot 59 in the sight to position the line of sights so as to accurately strike the center of the projection of the light beam on the screen. A mark on the casing top 43, such as the mark 58¹ is made as a "zero" mark, directly opposite the "zero" graduation on the sight, and the sight is clamped in this position.

Thus, the sights are positioned to accurately determine a horizontal beam at a distance of 25 feet from the signal, and all that is necessary for positioning the signal to give a glide path of a specified angle is to position the rear sight with its angle designation opposite mark 58¹ and adjust the signal lamp so that the center of the projected beam on the screen at 25 feet is at the point where the line of sights strikes the screen.

With this arrangement of parts it is clear that with a portable screen, as 57, if it be necessary to replace parts of the signal or repair the same, the line of sights provided permits a ready subsequent adjustment of the signal, so as to give the exact angle of glide path as that previously given. For example, after a lamp has been replaced, the screen is set up at 25 feet in front of the signal and after leveling, the signal is adjusted by means of bolts 50 and 51 to position the center of the emitted beam accurately on the level where the line of sights intersects the screen. Thus, the desired angle of glide path is readily obtainable in the field even though a lamp be used for replacement which has a filament somewhat improperly positioned.

The wiring diagram of Fig. 5 shows the wiring and apparatus received in casing 41 for controlling the signal. The apparatus for controlling the signal and which is received in box 41 includes the above light bulb 21, a toggle switch 60, having central posts 61 and 62 which can, at will, be connected to upper posts 63 or lower posts 64, whereby to control the signal by means of direct current from a 10-volt source as indicated at 65, or by alternating current from a source as indicated at 66. The apparatus includes in addition a rectifier 67, a transformer 68 and a flashing relay 69 which latter can be of any suitable type as, for example, that disclosed in the patent to O. S. Field, No. 1,969,065, granted August 7, 1934.

The flashing relay operates to make and break connection to the light source at any desired rate, such as may be characteristic of the particular location where the signal is employed. With the toggle switch positioned for operation by direct current, the direct current source supplies both the light source and the flashing relay. When the switch is positioned to control the signal by alternating current, the transformer is connected in circuit to provide for energizing the lamp with the proper voltage of alternating current which in the particular case in question is 10 volts. The alternating current is rectified by the rectifier and the rectified current controls the flashing relay as is obvious from the showing in Fig. 5.

In this manner the signal can be controlled from either an alternating or direct current source, and in each case the signal is flashed at any desired rate and preferably at a rate characteristic of the location of the signal.

Referring now to Fig. 3, there is here shown in a wholly diagrammatic fashion, a portion of the prismatic lens 35 of the signal shown in Figs. 1 and 2. This showing is not drawn to exact scale but is proportioned so as to more clearly show the principle of operation of the optical system and still fit within the drawing space available. But a single complete flute or prism is shown together with portions of the adjacent prisms. There is here shown a complete prism 70 having a plane rear face, and a convex front face. The curvature of the front face is so chosen as to cause the upper half thereof to refract light rays, striking the rear face at right angles thereto, to be deflected downwardly with respect to the principal axis 71 at an extreme angle of substantially 4°. The lower half of the prism, in a similar manner, refracts such normal light rays upwardly with respect to the principal axis at an extreme angle of approximately 4°. The angular spread, it is of course to be understood is variable, in accordance with requirements, but as one specific example, the above angle of 4° is chosen.

Above and below the prism 70 are shown portions 72 and 73 of adjacent prisms.

To the rear of the prismatic lens is a series of filters, the upper half of each prism being backed up by a filter 74 to filter out all but the red light behind, while the lower half of each prism is a filter 75 to filter out all but the green light, the fragmentary portions of filters 76 and 77 being in like manner respectively green and red filters.

Between the separate filters ar opaque portions 78, 79 and 80 which are relatively narrow and are positioned to be accurately centered directly behind the places where the lens curvature changes critically, namely, at the roots and the crowns of the prismatic lens.

To the rear of the prismatic lens is shown a portion of the parabolic reflector 20 although as stated above the relative positions of the parts is not shown accurately to scale, as space on the drawing prohibits it, but the showing is such as to clearly bring out the principle of operation of the optical system.

There is also shown the filament 22 of the lamp employed and this filament as shown is in the form of a coil and is viewed from the end and though it is a concentrated filament, it necessarily has a finite size. Thus, three extreme portions of the filament can be considered in discussing the optical system and its action, namely, the center 81 of the filament, which is placed accurately on focus and the extreme sides 82 and 83, which are necessarily off focus all with respect to the reflector, and hence the light therefrom is affected differently by the prismatic lens.

In this signal it is of course apparent that light from every point of the filament strikes every point on the reflector from which it is reflected to pass through the filter and the prismatic lens to form the emerging light beam.

Consider first the point 84 on the reflector which is on the principal axis of the lens and consider light from the center 81 of the filament striking this point 84 as indicated by beam 85. This beam 85 leaves the reflector as beam 85a to strike the lens in a normal direction and were it not for the opaque portion 78 it would pass through the lens at the crown and follow the principal axis 71.

In the same manner light from the center of the filament indicated as beam 86 and striking the reflector at point 87 leaves the reflector as beam 87a to strike the lens in a normal direction at the root of the lens and emerge to form a beam as 87a in a direction parallel to the principal axis of the lens were it not for the opaque portion 79. The beam 88a, originating at the center of the filament and striking the reflector at point 89, strikes the lens at the root of the lens and were it not for the opaque portion 80 would emerge parallel to the principal axis along line 88a.

Now consider point 90 on the reflector which though greatly exaggerated in the drawing is but very slightly inwardly of point 87. A beam 91 originating at the center of the filament and striking this point 90 of the reflector passes through the red filter 74 which it strikes in a normal direction leaves the reflector as beam 91a and is refracted by the upper half of the flute or prism 70 to be directed downwardly as indicated at 91a to limit the spread of the emerging beam to an angle of substantially 4° below the principal axis. In a similar manner the point 92 on the reflector which is but very slightly above point 89 reflects light originating from the center of the filament and constituting a beam 93 as a beam 93a which passes through the green filter 75 which it strikes in a normal direction and is refracted by the lower half of prism 70 to be directed upwardly as the continuing beam 93a at an angle of substantially 4° above the principal axis whereby to thus limit the spread in an upward direction of the emerging signal beam.

Thus far, it is clear that these considered limiting beams define an emerging beam of a spread of substantially 8° measured in a vertical plane with the portion above the principal axis of a green color and a portion below the principal axis of a red color. Also, that each prism or flute of the entire prismatic lens will function in the same manner to form a combined and continuous beam as viewed by an observer at a short distance in front of a signal which will be of the same combined character as the character of the beam produced by each prism. This is, of course, due to the fact that at a short distance in front of the signal the eye of an observer has not sufficient resolving power to see the beam from the separate prisms as separate beams.

Considering now the points 94 and 95 on the reflector which although exaggerated in the drawing are but very slightly above and below the point 84 which is on the principal optical axis. Light rays from the center of the filament striking these points are reflected in rays 96a and 97a which after passing through the filters are refracted by the lens to fall respectively below and above the principal axis and hence to contribute the proper color to the portion of the beam in which they are located.

So far only the light from the very center of the filament which, it should be borne in mind, is the only part that is accurately on focus has been considered. It is seen that with a true point source of light and a lens which is optically perfect, the resulting beam from the signal would comprise a two-colored beam with the upper half in this particular case of a green color and the lower half of a red color.

Assuming for the moment what is almost invariably the case in practice, that the prismatic lens is not optically perfect then at the roots and at the crowns the outer surface of the lens for a very short distance is flat and is parallel to the rear surface of the lens. In this case, rays of light which strike the rear face of the lens normally will pass through without being refracted and so without crossing the optical axis. Thus, the ray 96a, for example, instead of passing below the axis would be above the axis and contribute red light to the portion of the beam which is intended to be and essentially is green. In like manner the ray 97a would contribute green colored light to the portion of the emitted beam which is intended to be red. At points somewhat more remote from the optical axis the curvature of the lens even though it not be optically perfect will be sufficient to refract the beams to their proper color positions.

In like manner the beams 91a and 93a which though greatly exaggerated in the drawing are but slightly removed from a position directly to the rear of the root portions of the lens would pass through the lens without refraction at these imperfect and substantially flat portions of the lens, and would contribute to the beam a color different from what is intended, and hence produce a region where the colors are mixed.

The net result of all this is that with a true point source of light which is, of course, impractical if the lens be slightly imperfect which in practice is very generally the case, a zone is produced in the emitted beam where the two colors are mixed and hence where a zone of a different resulting color is produced.

The green and red filters referred to in this discussion are so chosen as to have the primary colors in such proportion that the combination of the green and the red produces a white appearing beam. Thus, the emitted beam with such an imperfect lens and such a theoretical point source of light is one that is green above and red below with an intermediate zone of such a mixture as to produce white appearing light to an observer having normal eyes.

Consider now the light which strikes the refractor and originates at the sides 82 and 83 of the filament which filament in practice is necessarily of a finite size. It can be seen that these beams after reflection from the reflector strike the lens system at an angle inclined to the normal and are positioned either above or below the normal. For example, at point 94 on the reflector light from the edges of the filament on reflection produces the beams 96b and 96c. The beam 96c is inclined to the normal in the direction that the lens refracts it and hence passes across the principal axis and contributes red light to the contemplated red portion of the beam. With beam 96b, however, which is inclined in the opposite direction to the normal and hence opposite to the direction which the lens refracts it, at the crown of the lens, the curvature of the lens even with a lens optically perfect will be insufficient to sufficiently refract it as to cause it to pass across the principal axis and hence this beam 96b produces an overlap of the colors above the principal axis.

In the case of point 84 on the reflector which is on the optical axis, the light from the edges of the filament produces similar off-normal beams 99b and 99c which in a manner similar to beam 96b are not sufficiently refracted by the lens even though the lens be perfect to cause them to cross the principal axis after having passed through their filters and the lens, and accordingly they produce an overlap of color.

It should be particularly noted that these beams reflected from the portion of the reflector that is on the principal axis produce a wider overlap of color than does the light reflected from points above and below the principal axis. In other words, it is the light passing through the lens immediately adjacent the crown that produces the widest overlap and at points progressively removed from the crown the overlap produced is progressively less in width until finally the curvature of the lens is sufficient to sufficiently refract the light to cause it to pass across the principal axis and contribute its color to the part of the beam that is of the same color.

From the above it follows that by blanking off the light that would otherwise pass through the lens at the crown and immediately to either side thereof the overlap can be reduced in width as much as desired. Thus, the opaque portion 78 can be increased in width as desired to decrease as desired the width of any overlap and this overlap is reduced from its outer edges inwardly toward the center.

Considering now and somewhat in detail the optical system at the roots of the lens, the light from the sides of the filament which strike the reflector at the point 90 produces beams 91b and 91c which strike the lens and filter inclined to the normal and respectively above and below the same. Beam 91c, which is sloped from the normal in the same direction as the lens refracts it, will close the principal axis and its red light will follow in the red portion of the emitted beam. Beam 91b, however, which is sloped to the direction which the lens refracts it will still be sufficiently reflected, unless the filament is unusually large, since the curvature of the lens at this point is relatively sharp, so as to close the principal axis as indicated. If, however, the lens is imperfect, and relatively flat at this point, this beam will proceed without much, or any, refraction as the beam 91bb and thus its red color will contribute to the beam above and below the principal axis, or in other words, will cause an overlap. In order that the overlap can be properly controlled at the roots of the lens, in the case of a relatively large filament, the opaque portions such as 79 and 80, directly to the rear of the roots, are employed and can be made relatively narrow or wide to compensate for various imperfections and sized filaments, such as occur in practice.

Considering the point 89 on the reflector, the light from the edges of the filament produce beams 88b and 88c which are sloped to the normal and also sloped in the direction which the lens refracts them, and hence will probably contribute to the beam as indicated, in the same way as do beams from intermediate points on the reflector, if the lens be optically perfect. But, if the lens be imperfect and hence flat at this portion, they form the dotted beams 88bb and 88cc.

This mixing of the colors in the overlap, with the colors so chosen that the overlap produces white light, is of use in producing a three-color beam with the overlapped portion showing as white light and forming a glide path for a landing plane, with the path defined above by the green portion of the beam and below by the red portion. In this manner a pilot following the white glide path is immediately aware of the fact when he has left the path and can ascertain by the color of the beam he has entered, whether he is above or below the proper path, and can accordingly control the plane to immediately bring him back in the white glide path.

In Fig. 3 is indicated, in a wholly diagrammatic manner, the type of beam as it appears to an observer at a short distance in front of the signal. The red area extends as shown by line 103, from the lower edge of the beam to well above the principal axis, and the green as shown by line 104 extends from the upper edge of the beam to well below the principal axis, whereby to produce a color overlap as shown by line 105. In practice this overlap with as perfect a lens as it is practical to obtain, and with as concentrated a filament as it is practical to employ, is considerably too wide for practical use as a glide path.

In practice, with a beam having a total angular spread of 8°, (4° above and 4° below the principal axis) the overlapped portion is of the order of 2°. In practice, however, the overlap should not be more than about ½°. In order to properly limit this overlap angle and to cut it down from the outer margins inwardly, the opaque portions as 78, 79 and 80 are employed and are accurately positioned to the rear of the lens and directly behind the critical crown and root lines and symmetrically positioned to either side thereof. By increasing or decreasing these opaque portions, the overlap can be reduced, or allowed to increase as desired.

As set forth above, the root portions of the lens are not as critical as the crown portions since there is an abrupt change in the curvature at this point and even the off-normal rays due to the size of the filament can be expected to be sufficiently refracted as to cross the principal axis. If, however, the lens is not optically perfect but has what amounts to a flat portion at the root lines, then an overlap will be produced unless this portion of the lens is in effect blanked off by an opaque insert, such as 79. These inserts can be of any desired material and in one form are constituted by a non-transparent plastic filled in between the spaced ends of the filters.

At the crown lines of the lens the curvature gradually changes from one direction through zero to the opposite direction and at this zero point, if the lens be optically imperfect, an overlap will be formed even though the filament be a true point source.

Furthermore, at these crown lines, even if the lens be optically perfect, the off-normal rays due to the finite size of the filament, striking the lens slightly above and below the exact crown lines may not be sufficiently refracted as to cause the emerging ray to cross the principal axis, and hence, an overlap may result.

To briefly summarize the above, it can be seen that an overlap of colors is produced under various conditions, and is produced by the crown portion and root portion of the prismatic lens.

Theoretically, the lens can be optically perfect and the light source can be a true point source. In practice, however, neither of these conditions can be exactly fulfilled, and in many cases the lens is quite imperfect and has flat portions at the root and the crown lines, while the filament has a finite size of considerable magnitude.

If the light source be a true point source and the lens be optically perfect, no overlap of colors will occur.

If the light source be finite and the lens perfect then an overlap will occur and is produced by the light beams at and adjacent to the crowns and adjacent to the roots. This, as explained above, is due to the fact that the divergence of the edge rays is too great for the lens curvature at these critical points to correct by refraction. This is more pronounced at the crowns than at the roots where the curvature is reentrant. It is possible that the size of the filament may be such that an overlap is produced at the crowns but not at the roots. On the other hand, the filament may be of such an extent, as compared to the curvatures involved that an overlap is also produced at the roots.

When the lens is not optically perfect, then the finite size filament produces a wider angle of overlap, as is obvious from the discussion above.

By the means described in detail above, a practical and simple means is provided for producing a three-color light beam of the correct angular spread and composition to serve in defining a landing glide path or for any other purpose found desirable.

In but one practical embodiment of the invention, which has been found desirable in practice, the filament employed is a small coil filament, about 3/64 inch in diameter, and about 3/16 inch long, positioned horizontally as shown in the drawings. The emitted beam is one having a spread in a vertical plane of 4° on each side of the principal axis and with an overlap central area having a total angular spread of about ½°. The opaque inserts such as 78 are of a width slightly less than the width of the filament, that is, about 1/32 inch and the prismatic lens employed comprises 7 separate flutes positioned horizontally with each flute about 1 inch in height.

As explained above, lens 33 in front of the filter lens has flutes running vertically and are designed to spread the light horizontally through an angle of any desired amount and in one specific case about 5° to each side of the principal axis was employed.

In the above discussion relating to Fig. 3 of the drawings it should be borne in mind that points such as 90 and 94 that are slightly removed from the lens root and crown positions are shown on the drawings to an exaggerated scale in order to simplify the explanation. These points are really very close to the root and crown points, but to show them in their actual relative positions is quite impractical, unless the scale of the drawing be increased many fold.

Referring now to Fig. 12, there is here shown a light signal of a construction, as described above, having a casing 16 and emitting a beam as indicated by dotted lines 110, which is projected on a screen 111 positioned a short distance, perhaps twenty-five feet from the signal. The projected beam then appears as illustrated and comprises an upper relatively deep area 112G, which is green in color, a like lower area 113R, which is red in color and an intermediate relatively shallow area 114W, which is the overlap and is white in color, and which comprises the desired glide path.

Referring now to Fig. 13, there is here shown how a signal in accordance with this invention can be usefully employed in the control of watercraft. A body of water 115 is shown and a channel therein is marked by two signals properly positioned, such as signals 116 and 117. These signals are constructed in accordance with the above disclosure and are positioned as shown to have a central white zone with a red zone to the left and a green zone to the right, the signal having been rotated 90° from the vertical in order to have the beam change in color in a horizontal plane, rather than as before in a vertical plane. A watercraft entering the inlet 118 can pick up the white path 119 and follow it until the white path 120 is visible, whereupon it can follow this path 120. If the craft should leave the white zone, and a green zone is encountered it is clear the craft should bear to port, whereas if a red zone is encountered the craft should bear to starboard.

Other applications and use for this improved polychrome light signal may readily present themselves, and it is contemplated that all such uses should be covered by this application.

The light signal as so far described and as shown structurally, primarily in Figs. 1 and 2, employs a fluted or prismatic lens having a plurality of parallel prisms. This plurality of prisms is an advantage over a single prism in that an observer at a distance and viewing the signal sees the entire circular lens as lighted by the colored light in which he stands, rather than seeing only a semi-circle of light if a single flute should be employed. However, in the interest of simplicity and economy, it might be desired to employ but a single flute, instead of a plurality thereof.

In view of the above and with reference to Fig. 7, there is here shown a light signal of a modified form, the showing being wholly diagrammatic. It includes a casing 120, a light source 121 and a parabolic reflector 122. The lens employed comprises a single flute 123 horizontally positioned and is provided with filters as described above. The upper filter 124 is a red filter and the lower filter 125 is a green filter. The resulting beam is substantially as described above, and as indicated has a green portion, as shown by line 126, a red portion as shown by line 127, these portions overlapping to produce a white light glide path, as indicated by line 128.

With regard to the form of invention shown in Fig. 7, the optical principles and arrangements, as described above, hold true, the only difference being that instead of employing a plurality of prisms in each signal, a single prism is employed.

It may be desirable to dispense with the separate filters, as described above, and employ lenses formed of colored transparent material which function in the dual role of lens and filter. Furthermore, in controlling the overlap, it may be desirable not to obscure or blank off portions of the lens as by means of opaque steps back of the lens, but to accomplish the same result by removing the otherwise obscured portions of the lens and bringing the remaining lens portions together. In other words, at the crown lines the curvature instead of gradually changing curvature has an abrupt change, while at the root portions, the curvature changes from one to the other direction, at a slightly shorter distance as measured from the crown point.

Figure 9:
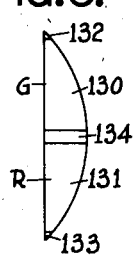
Fig. 9 is a diagrammatic view of a portion of the form of signal of Fig. 8.
Figure 10:
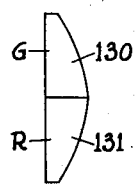
Fig. 10 is a diagrammatic view of a portion of the form of signal of Fig. 8.

This form of the invention is shown in Figs. 9 and 10. In Fig. 9 is shown one flute or prism in accordance with the above description, the upper portion 130 being formed of green transparent material such as glass to function as a lens and a green filter, and a lower portion 131 being formed as a lens and a red filter. Portions at the roots, indicated at 132 and 133 and the portion at the crown indicated at 134, which portions in the forms earlier described would have been blanked off by opaque strip portions are in this form removed entirely. Then the portions 130 and 131 are brought together to form a completed flute, as shown in Fig. 10. This flute or prism then operates, as is obvious, exactly as does the construction shown in Fig. 3, and described above in detail. However, in many cases, this form of Fig. 10 may be a much simpler and more economical form to produce, since the separate filters have been eliminated, and the obscuring opaque portions have been eliminated. Furthermore, the necessity for accurately positioning the filters and opaque portions with respect to the lens, so as to properly function, has been obviated.

Figure 8:
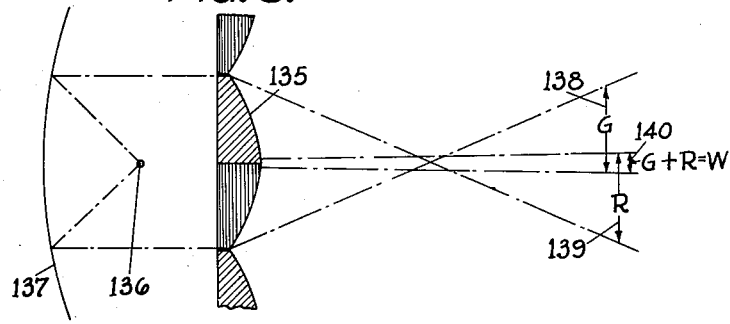
Fig. 8 is a wholly diagrammatic view of a second modified form of this signal.

In Fig. 8 is shown wholly in a diagrammatic form a signal employing a polyfluted prismatic lens, with the flutes, such as 135, formed as described in connection with Fig. 10, and having a light source 136 and reflector 137, whereby to produce a beam, as indicated, of a green color at 138, a red color at 139 and a white overlap as at 140.

It is to be understood that at times only the lens portions adjacent the crown will be removed and the root portions not removed. Also, it is contemplated that if desired the signal as in Fig. 8 (and Fig. 11 described below) can employ separate filters meeting at the center in which case the lens parts will be made of clear glass.

Figure 11:
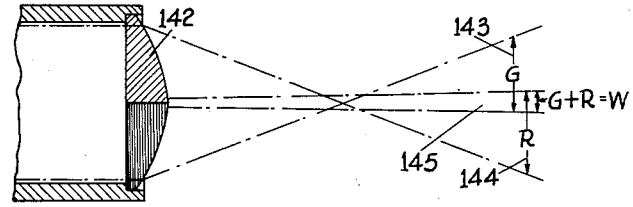
Fig. 11 is a wholly diagrammatic view of a third modified form of the invention.

In Fig. 11 is shown a further modified form of the invention which differs from the form shown in Fig. 7, only in that the single flute 142 here employed is formed as shown in Fig. 10, and described above, namely, so as to eliminate the separate filters and opaque portions. The beam produced is in accordance with what is described above in connection with the various other forms, and as shown on the drawing, has a green zone 143, a red zone 144, and an overlap white zone 145.

In considering the above disclosure, it should be constantly borne in mind that the drawings are in form and in many cases without regard to accurate scale, in order to bring out the various operative features and optical principles involved, and without necessitating so large a scale as to be impractical on drawings somewhat limited as to size.

To briefly summarize the features described above in detail, it may be useful to briefly review various of the features. A signal is produced which can be tilted, within limits, at any desired angle to the horizontal and which emits a beam having two distinctive colors, separated by a white portion, the white portion being obtained by a proper choice of the other two colors and by an overlap of these colors. Due to the necessarily finite size of the filament which must be employed in practice and/or the imperfections in the optical characteristics of the lenses which it is practical to employ, the overlap resulting has too wide an angle of spread for practical use, and hence means is provided for reducing the angular spread of this overlap to whatever extent it becomes desirable.

The above rather specific description of several forms and uses which this invention can assume has been given solely by way of example, and is not intended in any manner whatsoever in a limiting sense. Various modifications, substitutions and adaptations can be made as may from time to time appear practical or expedient without departing from the scope of the invention here disclosed and intended to be here protected, except insofar as it may be limited by the following claims.

Having described my invention, I now claim:

1. A light projecting signal for giving a polychrome beam for defining a course comprising, a light projecting lens having a plurality of parallel convex flutes each having a principal focus outside the signal, a light source of finite dimensions, a reflector for concentrating light from said source to be projected by said lens into a narrow main beam along the axis of the signal, two filters of complementary colors for each flute located in the path of the light passing through that flute from said reflector, one of said color filters determining the color of the light passing through one portion of its flute to provide a narrow beam of one color on one side of the optical axis of said flute, the other of said color filters determining the color of the light passing through the other portion of its flute to provide a narrow beam of light of the other color on the other side of the optical axis of said flute, said reflector and flutes cooperating with the finite dimensions of the light source to divert some of the light rays passing through the central portion of each of said flutes away from its principal focus and provide a partial overlapping of the beams of different colors from such flute and its color filters, said overlapping portions of said different colored beams constituting a divergent beam of coalescing colors much narrower than the main beam of the signal and providing the visual effect of a color distinctive from either of the colored beams alone, whereby the beam of overlapping and coalescing complementary colors defines a narrow path along the axis of the signal having a visual aspect of color distinctive from the different observable colors on the respective opposite sides of such path and enabling an observer to determine his relative position in the main beam of the signal.

2. A light projecting signal for giving a polychrome beam for defining a course comprising, a lens system including a lens having a plurality of parallel convex flutes and another lens for spreading the light beam in the planes of said flutes, a light source of finite dimensions, a parabolic reflector for concentrating light from said source into substantially parallel rays along the axis of said lens system, a shield intercepting direct rays from said light source through said lens system, two filters of complementary colors for each flute, one of said filters determining the color of light passing through one-half of its flute to provide a narrow beam of one color on one side of the optical axis of said flute, the other of said filters determining the color of the light passing through the other half of its flute to provide a narrow beam of light of the other color on the other side of the optical axis of said flute, said reflector and lens system cooperating with the finite dimensions of the light source to divert some of the light rays passing through the central portion of each of said flutes and said color filters from its principal focus and thereby provide a partial overlapping of the beams of different colors from such flute and its color filters, said overlapping portion of said different colored beams constituting a divergent beam along the axis of the main beam of the signal and much narrower in cross-section than said main beam, the coalescing of the different complementary colors in said overlapping portion having the visual effect of a color distinctive from either of the colored beams alone, whereby the main beam of said signal has distinctive color aspects on opposite sides of a narrow beam of a different observable color to enable an observer to determine his relative position in said main beam of the signal.

3. A light projecting signal for giving a parabolic beam of three distinctive colors for defining a course comprising, a source of light of finite dimensions, a lens having a plurality of parallel convex flutes, a reflector for concentrating light from said source to be projected by said lens into a relatively narrow main beam along the axis of the signal, a shield intercepting direct rays from said light source through said lens, a plurality of color filters located in the path of the light passing through said lens, each flute of said lens having two color filters of complementary colors for determining the color of the light passing through different portions of said flute, each of said flutes and its color filters cooperating with the finite dimensions of said light source to divert light rays passing through the central portion of said flute from its principal focus and provide a partial overlapping of beams of different colors from such flutes and its color filters, and a narrow opaque strip for each flute intercepting some of the light rays passing through said central portion of that flute to limit the width of overlapping of said different colored beams, said overlapping portions of said different colored beams constituting a divergent beam of coalescing colors having a spread of less than two degrees and providing the visual effect of a color distinctive from either of the colors of the colored beams, whereby the narrow divergent beam of coalescent complementary colors along the axis of the main beam of the signal has a distinctive visual color aspect enabling an observer to determine his relative position in the main beam of the signal.

4. A light projecting signal for giving a polychrome beam for defining a course comprising, a light source of finite dimensions, a parabolic reflector, a lens having a plurality of parallel abutting convex flutes with root portions at their adjoining edges, a shield cutting off passage of direct light rays from said source through said lens, each flute of said lens having two filters of complementary colors determining the color of the light passing through opposite halves of said flute, each of said flutes and its color filters cooperating with the finite dimensions of said light source to divert rays of light passing through the central portion of said flute and the root portions at its edges from the principal focus of said flute to provide a partial overlapping of the different colored beams, said overlapping portions of said different colored beams constituting a divergent beam of coalescing colors having a distinctive color aspect from the color of either beam, and a plurality of narrow opaque strips located to intercept some of the light passing through said central and root portions of said flutes to limit the spread of the beam of coalescing colors to less than two degrees.

JAMES W. KNAPP.

REFERENCES CITED

The following references are of record in the file of this patent:

UNITED STATES PATENTS

| Number | Name | Date |
|---|---|---|
| 867,256 | Dioan | Oct. 1, 1907 |
| 1,230,669 | Cassady et al. | June 19, 1917 |
| 1,266,554 | Coleman et al. | May 21, 1918 |
| 1,348,855 | Fassenden | Aug. 10, 1920 |
| 1,402,816 | Wallis | Jan. 10, 1922 |
| 1,429,067 | Dole | Sept. 12, 1922 |
| 1,432,659 | Bochet | Oct. 17, 1922 |
| 1,442,681 | Craig | Jan. 16, 1923 |
| 1,478,236 | Luby | Dec. 18, 1923 |
| 1,989,095 | Howard | Jan. 29, 1935 |
| 2,023,708 | Spring | Dec. 10, 1935 |
| 2,039,647 | House | May 5, 1936 |
| 2,051,327 | Chalfant | Aug. 18, 1936 |
| 2,277,563 | Scott et al. | Mar. 24, 1942 |
| 2,286,201 | Farrand et al. | June 16, 1942 |
| 2,386,268 | Roper | Oct. 9, 1945 |
| 2,411,877 | Flett | May 18, 1948 |

FOREIGN PATENTS

| Number | Country | Date |
|---|---|---|
| 20,941 | Great Britain | of 1897 |
| 215,086 | Great Britain | May 1, 1924 |
| 537,960 | France | Mar. 11, 1922 |